Figure 1:
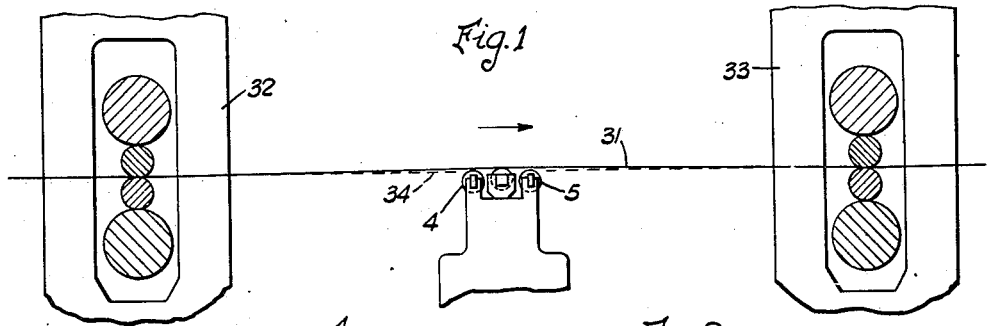

Feb. 29, 1944. M. D. STONE ET AL 2,343,229

STRIP TENSION MEASURING DEVICE

Filed Sept. 25, 1942 2 Sheets-Sheet 1

INVENTORS
Morris D. Stone
Walter W. McBane
Joseph I. Grunberger
by J. E. Dickinson atty.

Feb. 29, 1944. M. D. STONE ET AL 2,343,229
STRIP TENSION MEASURING DEVICE
Filed Sept. 25, 1942 2 Sheets-Sheet 2

INVENTORS
Morris D. Stone
Walter W. McBane
Joseph T. Greenberger
BY J. E. Dickinson atty Patented Feb. 29, 1944

2,343,229

UNITED STATES PATENT OFFICE 2,343,229

STRIP TENSION MEASURING DEVICE

Morris D. Stone, Walter W. McBane, and Joseph I. Greenberger, Pittsburgh, Pa., assignors to United Engineering & Foundry Company, Pittsburgh, Pa., a corporation of Pennsylvania Application September 25, 1942, Serial No. 459,676

5 Claims. (Cl. 265—1.6)

This invention relates to apparatus for measuring the tension on continuous metal strip passing through a rolling mill.

The proper control of strip tension permits high rolling speeds, lower maintenance costs, more precise gage accuracy and increased production of better quality strip. It is customary to measure strip tension by the use of sensitive apparatus, called a tensiometer, which includes a vertically movable auxiliary or measuring roll across which the strip travels. This roll is mounted above or below the pass line of the rolling mill so as to deflect the strip from the pass line, whereby the strip will exert pressure in a vertical direction on the roll. Changes in tension on the strip thus cause the roll to move vertically and actuate the tensiometer, which heretofore has included two pressure measuring instruments disposed one at each end of the roll. These two instruments are so interconnected that unequal strip pressures on opposite ends of the roll, such as due to off-center rolling, are taken into account and a reading given which shows the tension on the strip.

It is among the objects of this invention to provide tension measuring apparatus which requires only one pressure measuring instrument, and in which that instrument is an enclosed unit that is small and compact.

The strip, in passing across the measuring roll forms an angle that is generally very flat. Consequently, if the vertical position of the pass line changes, due to such things as roll wear, the above-mentioned angle likewise may change sufficiently to alter the pressure of the strip on the measuring roll. Thus, for any given tension on the strip the reading of the tensiometer will vary with variations in the angle formed by the strip in crossing the measuring roll. This has required constant repositioning of the tensiometer measuring roll in order to keep the readings correct.

Accordingly, it is another object of this invention to provide a tensiometer which is not influenced by normal changes in the vertical position of the pass line of the mill. More specifically, it is an object of the invention to maintain constant for any given strip tension the angle formed by the strip in traveling across the measuring roll of a tensiometer.

In accordance with this invention, a horizontal roll is adapted to be mounted adjacent a rolling mill stand so that metal strip passing through the stand will travel across the roll. The strip-engaging area of the roll is spaced vertically from the pass line of the mill, preferably slightly above it. A pressure measuring device is mounted beneath the central portion of the roll, and a rigid member which rests only on that device rotatably supports the opposite ends of the roll and holds it in position. This rigid member projects laterally from one side of the roll with its projecting portion pivotally mounted on an axis parallel to the roll axis so that the roll is permitted to move substantially vertically as the tension on the strip passing across it varies. Such movement of the roll operates the pressure measuring device. This mounting of the measuring roll on the pivoted rigid member permits the use of a single pressure measuring device.

A pair of rollers are mounted on opposite sides of the measuring roll for engagement by the strip. These rollers are disposed with their strip-engaging areas between the mill pass line and the strip-engaging area of the measuring roll. As a result, the strip remains in contact with the rollers regardless of normal variations in the vertical position of the pass line. This prevents changes in the height of the pass line from changing the angle formed by the strip in traveling across the measuring roll, so the downward pressure of the strip on the measuring roll remains constant for any given strip tension.

An especially desirable type of pressure measuring device is formed with its electrical elements in a metal housing or pot the top of which is closed by a metal diaphragm that is operatively connected to the movable electrical elements beneath. This instrument preferably is mounted beneath the center of the vertically movable roll-supporting means for which it forms a support. Variations in tension on the strip passing across the measuring roll vary the pressure on that roll and thus cause the diaphragm to be flexed slightly to move the electrical elements of the tensiometer and give the proper tension reading.

Figure 2:
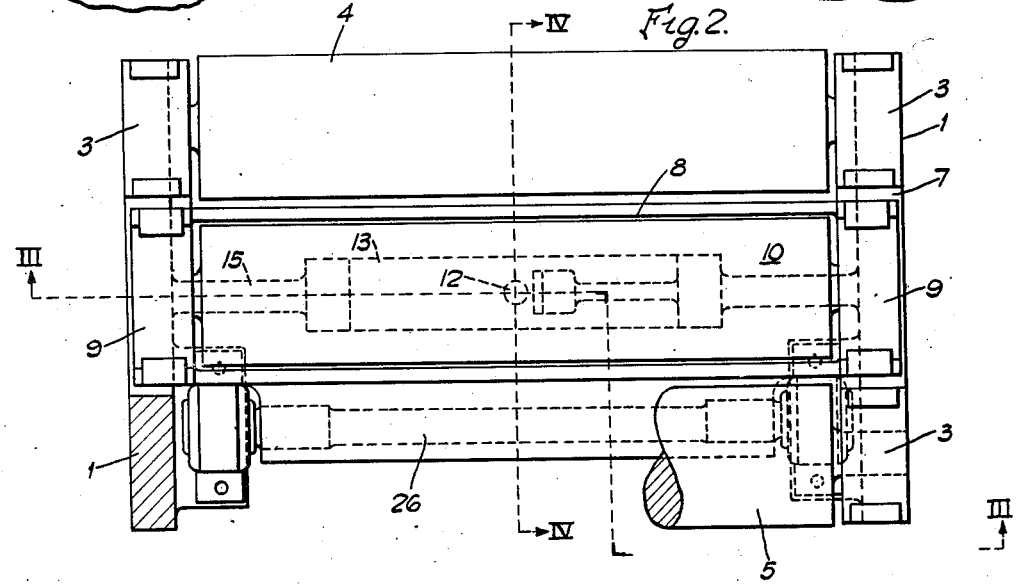
Figure 3:
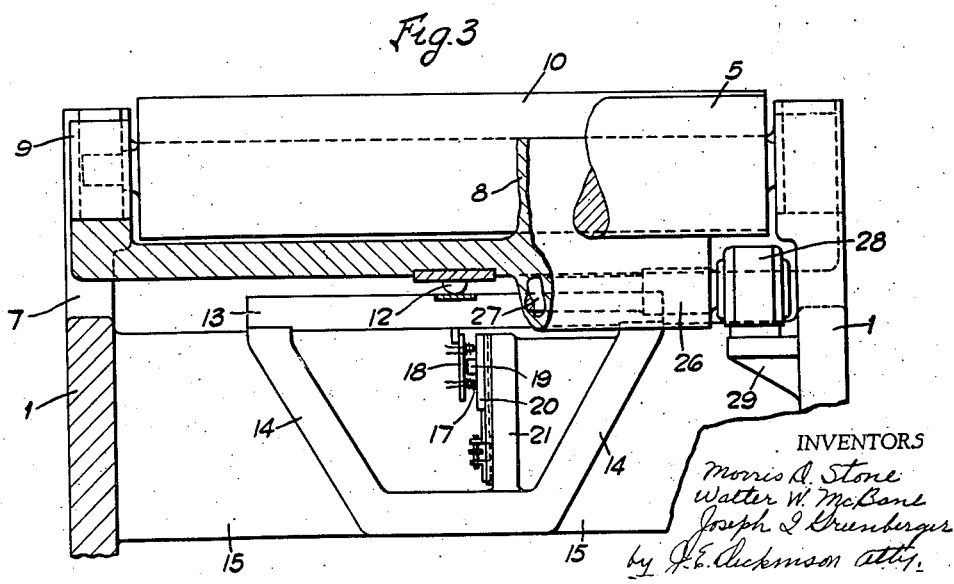
Figure 4:
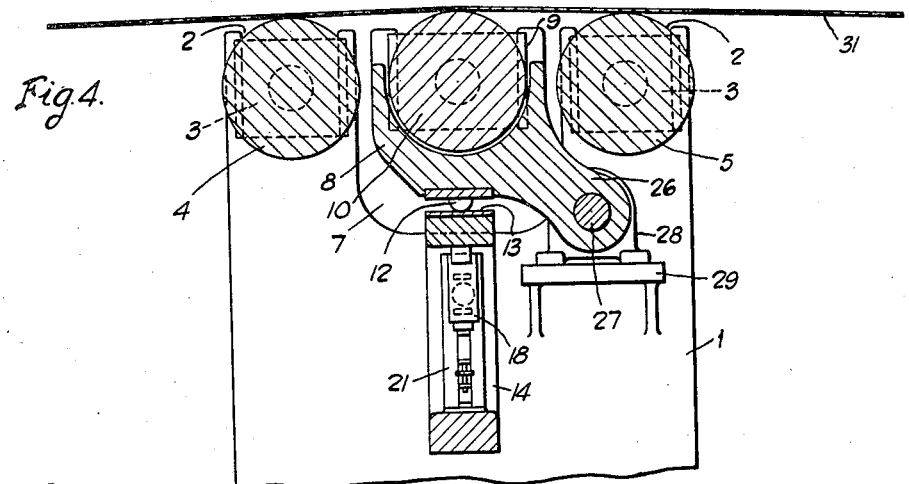
Figure 5:
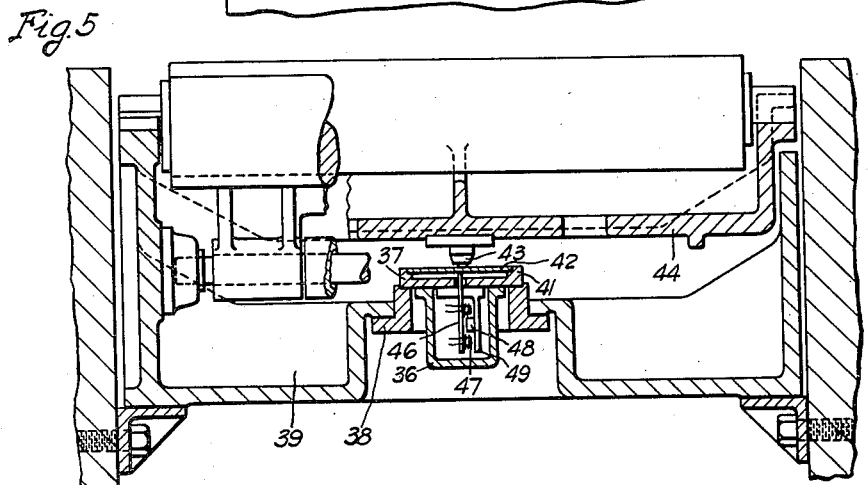
Figure 6:
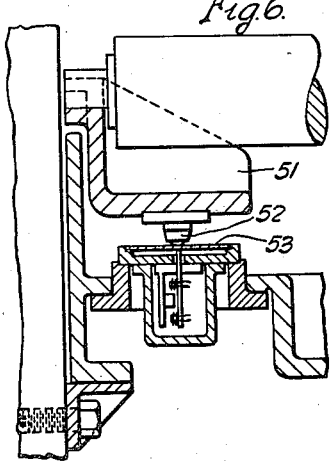

The invention is illustrated in the accompanying drawings in which Fig. 1 is a diagrammatic section through a pair of mill stands with our tension measuring apparatus engaged by the strip between the mills; Fig. 2 is an enlarged plan view of the tension measuring apparatus with one of the idler rollers broken away; Figs. 3 and 4 are vertical sections taken on the lines III—III and IV—IV, respectively, of Fig. 2; Fig. 5 is a view similar to Fig. 3 showing a modification of the pressure measuring device and Fig. 6 is a fragmentary vertical section of an end of another modification of the apparatus.

Referring to Figs. 2, 3, and 4 of the drawings, a pair of vertical end plates 1 are mounted in laterally spaced parallel relation. Each plate is provided at its opposite ends with downwardly extending recesses 2 in which bearings 3 are mounted. A pair of laterally spaced idler rollers 4 and 5 are journaled in these bearings. Between the bearing recesses 2 in each end plate there is a considerably larger and deeper recess 7 into which projects an end of a rigid member or cradle 8 that is substantially U-shape in transverse section. The ends of the cradle are spaced from all sides of recesses 7 and contain bearings 9 in which a measuring roll 10 is journaled. The top of the roll extends above the sides of the cradle.

The cradle is vertically supported only at its center, where a downwardly projecting boss 12 rests on the center of a horizontal beam 13 that forms the top of a pressure measuring device. The beam rests at its ends on the tops of downwardly converging side members 14 that are rigidly connected to end plates 1 by vertical web 15 integral therewith. The electrical elements of the pressure measuring device include a pair of vertically spaced electric coils 17 mounted on one side of a vertical plate 18 depending from the center of the horizontal beam. These coils straddle a pole piece 19 mounted on a vertically adjustable plate 20 which is supported by a block 21 attached to the adjacent side member 14. The coils are connected in a well-known manner to a meter or scale (not shown) that indicates strip tension when beam 13 is deflected vertically by the pressure of boss 12 against it.

To balance the cradle in position on its center point of support it is provided with an integral side portion 26 that projects laterally under roller 5. This side portion is provided with an opening extending through it parallel to the axis of the measuring roll for receiving a shaft 27 that is journaled at its ends in bearings 28 mounted on brackets 29 secured to the inside of the end plates beneath roller 5. It will thus be seen that with this mounting the cradle is held in position between the side rollers where it is prevented from tilting longitudinally and from moving in a horizontal plane, but it is free to move substantially vertically under the pressure of metal strip traveling over measuring roll 10. Such pressure is transmitted through cradle 8 which causes boss 12 to deflect beam 13 downwardly and thus operate the pressure measuring device.

The measuring roll is so mounted between the rollers 4 and 5 on its opposite sides that it projects a short distance above them so that traveling metal strip 31, which engages the two rollers and center roll as shown in Fig. 4, will exert downward pressure on the center roll. This apparatus may be mounted close to the working rolls of a rolling mill or, as shown in Fig. 1, it may be mounted substantially midway between two successive stands 32 and 33 of a continuous mill. The apparatus is positioned with the upper surface of measuring roll 10 above the normal pass line of the mill stands so that the strip will have to travel upwardly from one stand to the measuring roll and then downwardly to the next stand. The strip thus exerts a downward pressure on the roll. Due to the fact that the cradle which supports the measuring roll is supported solely by the boss 12 at its center, a single pressure measuring instrument is sufficient to measure the tension on the strip because all of the pressure of the strip on the roll is transmitted through the boss to the pressure measuring instrument. For the same reason no provision has to be made for correcting for off-center rolling, whereby a material saving is made in tensiometer cost.

Another feature of this invention is that the rollers 4 and 5 beside the measuring roll likewise are disposed with their upper or strip-engaging surfaces above the normal pass line of the mill, indicated by the broken line 34 in Fig. 1, but of course, below the top of the measuring roll. The measuring roll and the two adjacent rollers are all disposed far enough above the pass line to insure the strip continuously engaging all three of them even though the vertical position of the pass line may vary, due to roll wear or other causes. Consequently, regardless of normal variations in the height of the roll passes, the strip remains in engagement with side rollers 4 and 5 and, therefore, for any given tension on the strip the angle that it forms in traveling over the measuring roll remains the same. With the same angle the vertical pressure of the strip on the measuring roll stays the same and the reading of the tensiometer remains correct. Any change of this angle of the strip is due solely to a change in tension on the strip, whereby the tensiometer shows only changes in tension.

In the modification of the invention shown in Fig. 5 the arrangement of the cradle and rollers is substantially the same but an improved type of pressure measuring device is illustrated. Thus, the instrument includes a pot-like housing 36 the upper end of which is secured to the bottom of a heavy disc 37 provided with a central opening. The disc projects laterally beyond the side of the housing and rests on a metal ring 38 that is rigidly mounted in an opening in the center of a rigid horizontal beam 39 that connects the vertical end plates of the apparatus. Disc 37 is encircled by an upwardly projecting flange 41 having an inside annular shoulder on which diaphragm 42 rests. This diaphragm supports the boss 43 that projects downwardly from the center of the roll-carrying cradle 44. It also supports the upper end of a narrow plate 46 that extends downwardly through the opening in the disc and carries the electric coils 47 of the electric deflection measuring device. These coils straddle a pole piece 48 on the side of a vertical plate 49 attached at its upper end to the bottom of the disc. Such a pressure measuring assembly is small and compact and is completely enclosed so that dirt and liquid can not interfere with its operation. Due to its size and construction it can readily be inserted in tension measuring apparatus or removed therefrom.

The same type of pressure measuring device is shown in Fig. 6, but in this case the cradle for the measuring roll is divided into two parts each of which supports one end of the roll. Each part of the cradle 51 is provided with a depending boss 52 that rests on the diaphragm 53 of an underlying pressure measuring device. Due to the cradle being divided into two independent parts it is necessary that the two instruments be electrically connected in such a manner that unequal pressures on them will be added so that the proper total strip tension reading will be given.

According to the provisions of the patent statutes, we have explained the construction and operation of our invention and have illustrated and described what we now consider to represent its best embodiment. However, we desire to have it understood that, within the scope of the appended claims, the invention may be practiced otherwise than as specifically illustrated and described.

We claim:

1. Apparatus for measuring the tension on metal strip passing through a rolling mill, comprising a horizontal roll having a strip-engaging area adapted to be spaced vertically from the pass line of the mill, a pressure measuring device mounted beneath the central portion of said roll, a cradle in which the roll is disposed, bearings in the opposite ends of the cradle rotatably supporting the ends of the roll, said cradle having a projecting side portion, a downwardly projecting member mounted on the bottom of the cradle and spacing it from said device, and means beside the roll pivotally supporting the cradle's projecting side portion on an axis parallel to the roll axis, whereby the roll is permitted to move substantially vertically as the tension on the strip passing across it varies to thereby operate the pressure measuring device.

2. Apparatus for measuring the tension on metal strip passing through a rolling mill, comprising a horizontal roll having a strip-engaging area adapted to be spaced vertically from the pass line of the mill, a pressure measuring device mounted beneath the central portion of said roll, a rigid member resting on said device and rotatably supporting the opposite ends of the roll, said rigid member projecting laterally from one side of the roll, means pivotally mounting the projecting portion of said member on an axis parallel to the roll axis, whereby the roll is permitted to move substantially vertically as the tension on the strip passing across it varies to thereby operate the pressure measuring device and a pair of rollers mounted on opposite sides of said roll for engagement by said strip as it passes across the roll, said rollers being disposed with their strip-engaging areas between said pass line and the strip-engaging area of said roll so that the strip will remain in contact with the rollers regardless of normal variations in the vertical position of the pass line, to thereby keep the operation of the pressure measuring device from being affected by such variations.

3. Apparatus for measuring the tension on metal strip passing through a rolling mill, comprising a horizontal roll having a strip-engaging area adapted to be spaced vertically from the pass line of the mill, a pressure measuring device mounted beneath the central portion of said roll, a pair of rollers mounted on opposite sides of said roll closely adjacent thereto for engagement by said strip as it passes across the roll, a rigid member resting on said device and rotatably supporting the opposite ends of said roll, said rigid member having a side portion projecting laterally under one of said rollers, and means pivotally mounting said side portion under said one roller on an axis parallel to the roll axis, whereby the roll is permitted to move substantially vertically between the rollers as the tension on the strip passing across it varies, to thereby operate the pressure measuring device, said rollers being disposed with their strip-engaging areas between said pass line and the strip-engaging area of said roll so that the strip will remain in contact with the rollers regardless of normal variations in the vertical position of the pass line, to thereby keep the operation of the pressure measuring device from being affected by such variations.

4. Apparatus for measuring the tension on metal strip passing through a rolling mill, comprising a vertically movable horizontal roll having a strip-engaging area adapted to be spaced vertically from the pass line of the mill, a diaphragm mounted beneath the roll, electrical deflection measuring elements disposed below the diaphragm, means connecting the diaphragm to one of said elements for moving it, a rigid member rotatably supporting the roll and provided with a depending projection resting on the center of the diaphragm for flexing it in accordance with the vertical loading of the roll as the tension on the strip passing across it varies, and a housing enclosing said electrical elements and connecting means and closed at its upper end by said diaphragm.

5. Apparatus for measuring the tension on metal strip passing through a rolling mill, comprising a vertically movable horizontal roll having a strip-engaging area adapted to be spaced vertically from the pass line of the mill, a pressure measuring device operated by the vertical movements of said roll as the tension on the strip passing across the roll varies, and a pair of rollers mounted on opposite sides of said roll for engagement by said strip as it passes across the roll, said rollers being disposed with their strip-engaging areas between said pass line and the strip-engaging area of said roll, whereby normal variations in the vertical position of the pass line have no effect on the operation of the pressure measuring device.

MORRIS D. STONE.
W. W. McBANE.
JOSEPH I. GREENBERGER.